Dec. 10, 1968     J. N. McMILLAN     3,415,430
MACHINE FOR FINISHING TROUSERS
Filed Aug. 2, 1965     11 Sheets-Sheet 1

Fig. 1

INVENTOR.
JERRY N. McMILLAN
BY
ATTYS.

Dec. 10, 1968  J. N. McMILLAN  3,415,430

MACHINE FOR FINISHING TROUSERS

Filed Aug. 2, 1965  11 Sheets-Sheet 4

INVENTOR.
JERRY N. McMILLAN
BY *Wells & St John*

ATTYS.

Dec. 10, 1968         J. N. McMILLAN         3,415,430

MACHINE FOR FINISHING TROUSERS

Filed Aug. 2, 1965         11 Sheets-Sheet 6

INVENTOR.
JERRY N. McMILLAN
BY Wells & St John
ATTYS.

Dec. 10, 1968    J. N. McMILLAN    3,415,430
MACHINE FOR FINISHING TROUSERS
Filed Aug. 2, 1965    11 Sheets-Sheet 8

INVENTOR.
JERRY N. McMILLAN
BY Wells & St John
ATTYS.

Dec. 10, 1968  J. N. McMILLAN  3,415,430

MACHINE FOR FINISHING TROUSERS

Filed Aug. 2, 1965  11 Sheets-Sheet 9

INVENTOR.
JERRY N. McMILLAN
BY Wells & St John
ATTYS.

United States Patent Office 3,415,430
Patented Dec. 10, 1968

3,415,430
MACHINE FOR FINISHING TROUSERS
Jerry N. McMillan, % Colmac Industries Inc., Box 167, Colville, Wash. 99114
Filed Aug. 2, 1965, Ser. No. 477,663
14 Claims. (Cl. 223—73)

ABSTRACT OF THE DISCLOSURE

A machine for finishing the trousers that includes an upright center buck for receiving the trouser crotch and the inside of the trouser legs. A tiltable waistband expander head carrying a front movable fly buck, two rear movable seat bucks, right and left stationary hip bucks and a movable fly press is positioned above the center buck for receiving the torso portion of the trousers. Side press bucks extending from below the trouser legs to above the waistband are movably mounted for pressing against the center buck and the head bucks for pressing the trousers therebetween. The upper portions of the side press bucks are contoured to cooperate with the hip and seat bucks. Cuff expanders are positioned between the side bucks and the center buck for receiving the trouser cuffs and stretching the trousers between the cuffs and waistband. The side bucks are hollow and contain liquid of 400° F. for finishing the trousers as they are being pressed.

---

The present invention relates to a machine for finishing trousers. In my prior Patent No. 3,117,704, there is disclosed a machine for this purpose. It is one purpose of the present invention to provide a new means for heating the pressing faces that engage and press the trousers and of supplying the steam needed for finishing the trousers.

It is also a purpose of this invention to provide a novel mechanism for controlling and effecting the waist band stretch in a machine of this character in such a manner as to maintain the desired proportion of movement of seat and fly guides as the trousers are stretched preparatory to pressing.

It is also a purpose of the invention to provide improved means for expanding and holding the cuffs of the trousers for pressing.

Other and more detailed objects and advantages of the invention will appear from the following detailed description and the accompanying drawings wherein a preferred form of the invention is shown. It should be understood, however, that the description and drawings are illustrative only and are not intended to limit the invention except insofar as it is limited by the claims.

Figure 5:
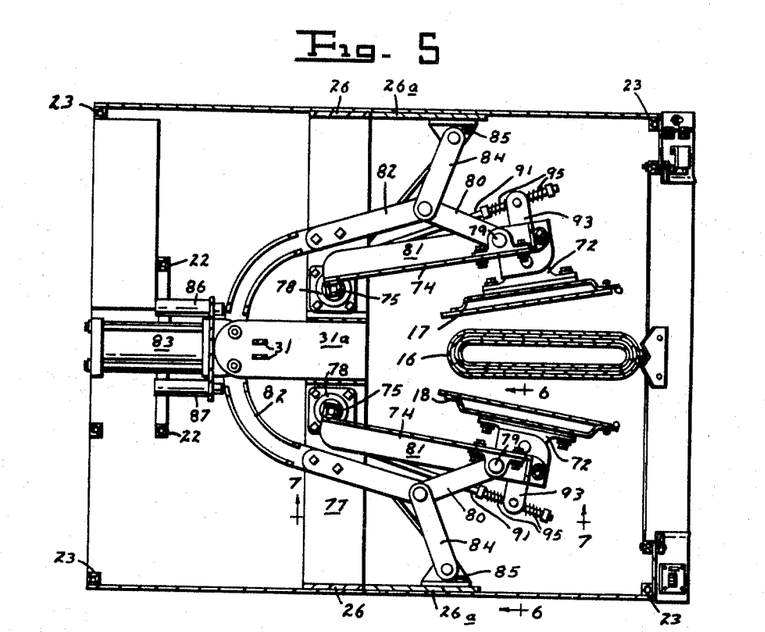
FIGURE 5 is a sectional view taken on the line 5—5 of FIGURE 4.
Figure 6:
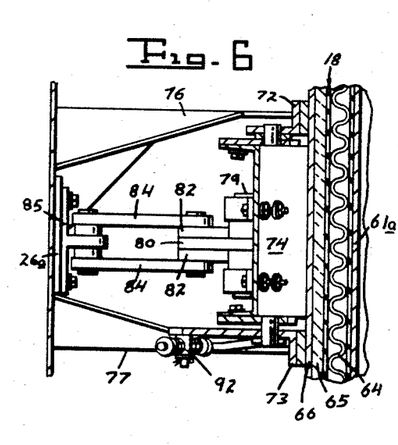
FIGURE 6 is a fragmentary sectional view taken on the line 6—6 of FIGURE 5.
Figure 7:
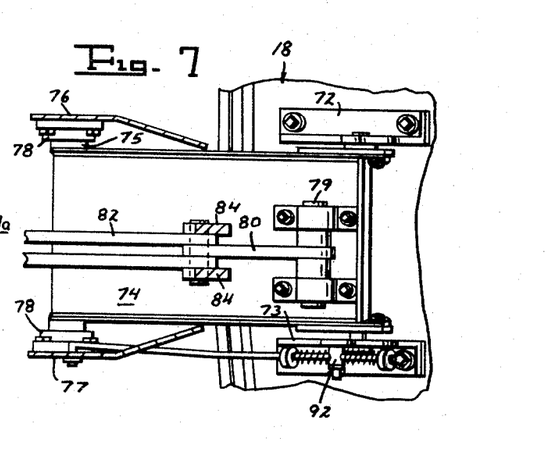
FIGURE 7 is a fragmentary sectional view taken on the line 7—7 of FIGURE 5.

In the machine of the present invention I provide a tilt back waist band expander head 10 on which the pants to be pressed are placed. This head carries a front movable fly buck 11, two rear movable seat bucks 11a and 11b, right and left stationary hip bucks 12 and 13 and a movable fly press 14. The waist band expander operating mechanism and the means to actuate the fly press 14 will be described later. The machine has a center leg buck 16 and right and left movable presser bucks 17 and 18. To the rear of the bucks 17 and 18 and outwardly thereof, I provide mechanism for moving the bucks 17 and 18 (see FIGURES 5–7) toward and away from the center buck 16. Also in the rear of the bucks 16, 17 and 18 is a mechanism for actuating and controlling two cuff expanders 19 and 20 that are placed in the pants cuffs after the garment is placed on the waist band expander head and this head is lowered from its tilt back position. The cuff expanders and the mechanism for mounting and operating them so as to stretch the pants legs and the cuffs is shown more in detail in FIGURES 16–20 inclusive and will be described more fully hereinafter.

The several parts just described and their cooperation with each other will be better understood from the following detailed description of the supporting and actuating mechanism for them. A platform or base 21 supports posts 22 and has uprights 23 at the four corners thereof. These uprights 23 are connected to each other above the bottoms thereof by fore and aft extending members 24 and a front cross member 25. A major mechanism support frame 26 is provided across the structure slightly to the rear of the middle of the supporting framework. The frame 26 carries two uprights 28 set in from the sides of the machine and extending upwardly and slightly forward from the frame 26. The tops of the posts 22 are connected to the uprights 28 by members 27. These uprights 28 provide pivotal support for brackets 29 on the bottom of the tiltable expander head 10. The head 10 is tilted by means of an air operated jack 30, shown in FIGURE 3. This jack is carried on upright 31 which in turn is supported on a framework 31a that extends rearwardly from the frame 26.

The expander head 10 includes a rear portion 10a housing an air supply fan, a mid portion 10b where steam is supplied and air is heated, and a front housing portion 10c which directs steam and air down inside a garment held on the bucks 12 and 13. As shown best in FIGURES 11–15, on the bottom of the portion 10c there are guides 32 for a plate 33. This plate carries the fly buck 11. The guides 32 also guide a second plate 36 which carries the bucks 11a and 11b. The hip bucks 12 and 13 are hung on brackets 34 and 35 on the bottom of the housing 10c. The plates 33 and 36 are moved with respect to the bucks 12 and 13 and with respect to each other by means within the portion 10c of the head 10 including a rock shaft 37 which is operated by an air jack 40 on the outside of the head 10. The jack 40 has its piston 40a adjustably connected to a lever arm 38 that is secured on the shaft 37 by a set screw 42. The arm 38 has spaced holes 38a to receive a pin 39 to connect the piston 40a to the arm 28 at different points. Within the head portion 10c there is an arm 43 fixed on the shaft 37. The arm 34 has a series of apertures 44 therein. One link 45 extends from the arm 43 to an upright 46 on a bar 46a carried by the plate 33. Another link 47 extends from a lower point on the arm 43 to an upright 48 on a bar 49 that is bolted to the plate 36 and can be adjusted endwise thereon by means of slots 49a.

The arrangement just described is used to move the plates 33 and 36 in the same direction but at different rates when the bucks 11, 11a and 11b are moved with respect to the bucks 12 and 13 to expand within a waist band. The various adjustments provided by the apertures 38a in the arm 38, the apertures 44 in the lever arm 43 and the slots 49a are ample to take care of all sizes of pants.

Figure 8:
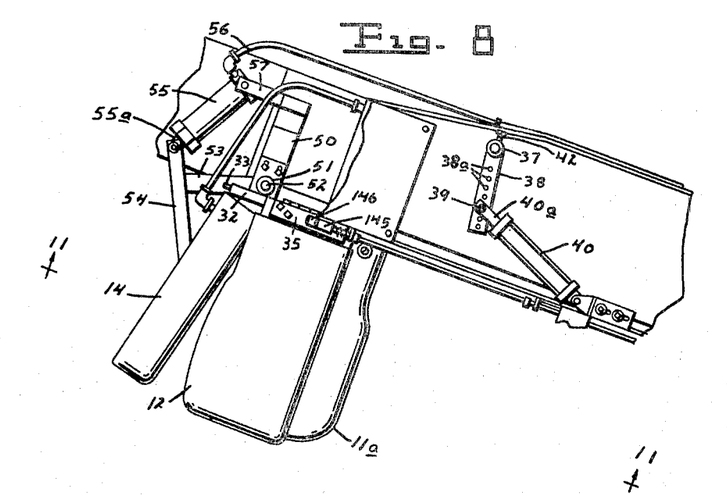
FIGURE 8 is a partial side view of the waist band stretching mechanism taken to show the side not shown in FIGURE 4.
Figure 9:
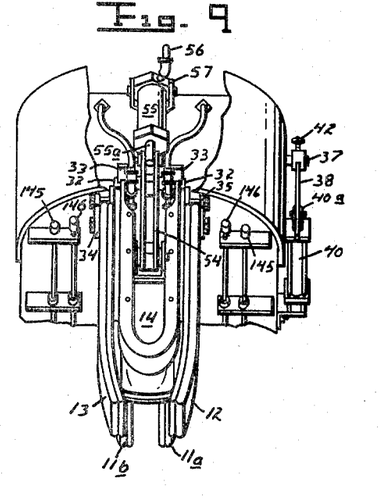
FIGURE 9 is a view looking at FIGURE 8 from the left.
Figure 10:
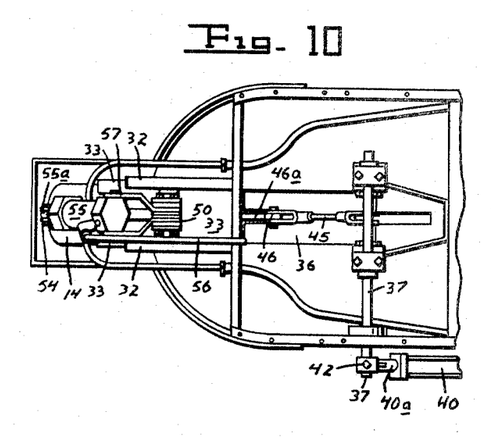
FIGURE 10 is a plan view looking down on FIGURE 8 with cover removed.

The plate 33 extends forwardly as shown in FIGURE 8 and provides mounting for a pedestal 50. The pedestal 50 has rollers 51 riding on the guides 32. An arm 53 is pivoted on the axle 52 for the rollers 51. This arm 53 has a cross bar 54 fixed to its outer end. The cross bar 54 has rollers 51 riding on the guides 32. An arm 53 is pivoted to the piston 55a of a jack 55. The piston 55a is spring retracted and is extended by air or steam pressure through a conduit 56. The jack 55 is pivoted on a bracket 57 on the pedestal 50. Since the pedestal moves with the front fly buck 11, the closing of the fly press 14 is the same for all positions of the buck 11. Steam for heating the fly press 14 which is hollow, is supplied trough inlet conduit 58 and outlet conduit 59.

Referring now to the main center buck 16 and the right and left movable presser bucks 17 and 18, the center buck is essentially of known general construction. The bucks 17 and 18 may also be conventionally steam heated and may have conventional steam outlets to the pants. For high temperature pressing for permanent creasing, the bucks 17 and 18, which have polished inner faces, are provided with means whereby they are heated in an unique manner and the fluid for pressing is applied between the buck surface and the pants from spray means along a vertical edge of the buck. In so called permanent crease pants the resin in the fabric requires a relatively high temperature with adequate controls in order to heat the resin properly. Temperatures of the order of 400 degrees F. are often needed to effect adequate setting of the create. I form the bucks 17 and 18 as illustrated best in FIGURES 21–24 respectively. Each buck is composed of a hollow shallow container 61 which is filled with a liquid such as an oil which can be heated above 400 degrees F. with safety and with little or no formation of vapor at such temperatures. The container 61 is not filled completely so as to leave adequate space for expansion as the liquid is heated. Thus, at the operating range very little if any pressure exists within the container 60. Fill and drain plugs 62 and 63 are provided. The rear wall 61a of the container has an electric heating unit 64 applied thereto with a suitable heat insulation backing 65 and a cover 66.

Figure 21:
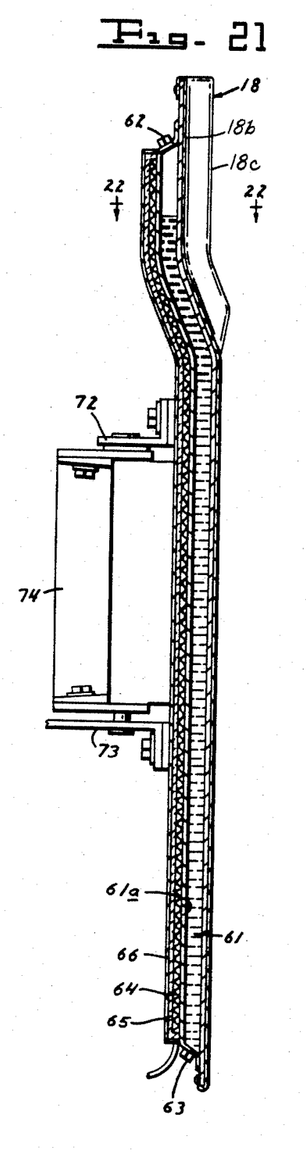
FIGURE 21 is an enlarged sectional view through one of the pressing members showing the manner of heating it.
Figure 22:
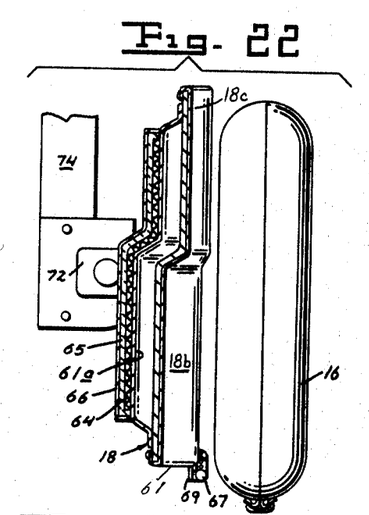
FIGURE 22 is a sectional view on the line 22—22 of FIGURE 21.
Figure 23:
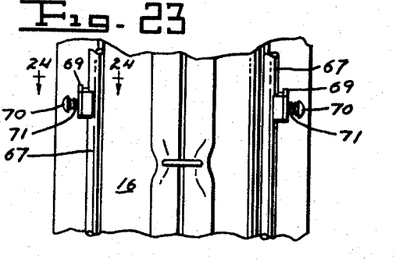
FIGURE 23 is a fragmentary front view on an enlarged scale of the pressing members.
Figure 24:
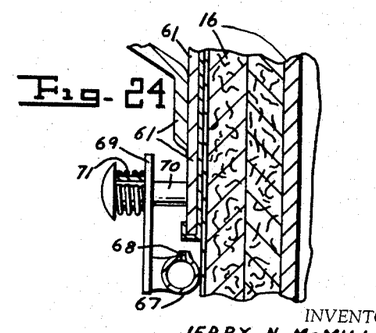
FIGURE 24 is an enlarged sectional view taken on the line 24—24 of FIGURE 23.

As may be particularly seen in FIGS. 21 and 22, the side bucks 17 and 18 have upper sections 17a and 18a that extend outwardly and upwardly from the lower sections of bucks 17 and 18. The upper sections 17a and 18a are elevated above the saddle of the center buck 16 for moving against waist portions of the trousers to press the trousers against elements of the waist expanding head 10. Specifically, upper section 17a and 18a have contoured surfaces 17b, 17c and 18b and 18c. The contoured surfaces 17b and 18b are indented for receiving the hip bucks 12 and 13 of the waist expanding head 10. The surfaces 17c and 18c protrude forward of the surfaces 17b and 18b respectively for receiving the seat bucks 11a and 11b. When the bucks 17 and 18 are moved inwardly the lower sections of the bucks 17 and 18 press the trouser legs against the center stationary bucks 16. The upper sections 17a and 18a move against the hip and seat portions of the trousers to press said portions against the hip and seat bucks 11a, 11b, 12 and 13.

Figure 20:
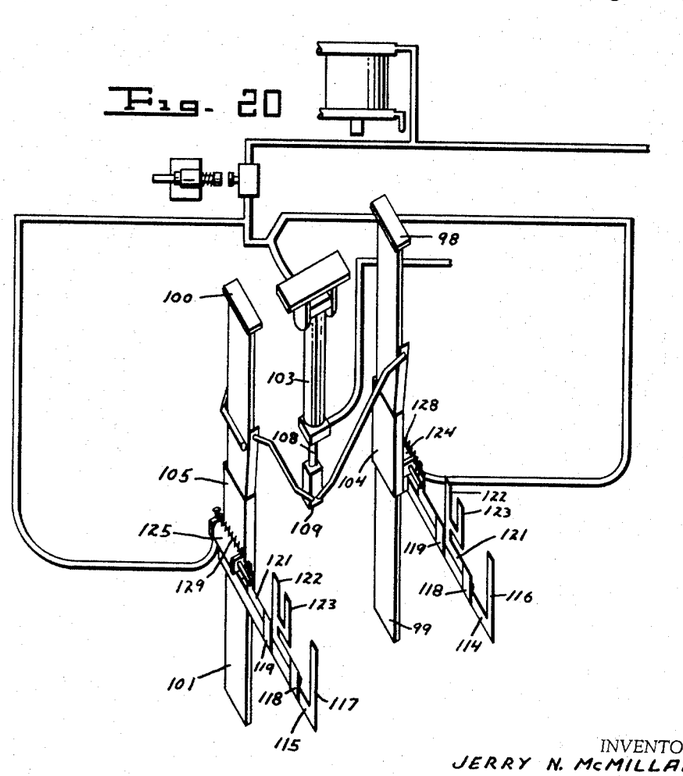
FIGURE 20 is a diagrammatic perspective view showing the cuff stretching members and the fluid connections thereto.

Along the front edge of each container 61 I mount a spray tube 67 in such a manner that the spray openings 68 of the tube direct fluid supplied thereto horizontally along the pressing face of the buck. Each tube 67 is mounted on the container 61 by laterally extending brackets 69 which are slidable on posts 70 provided on the container 61. Springs 71 urge the brackets toward the center buck 16 so that the openings 68 are positioned, before the bucks close as shown in FIGURE 20, to direct the fluid therefrom across the inner faces of the movable bucks. When the bucks close against the center buck the tubes 67 are pushed back by the center buck so they do not interfere with the final closing pressure. With this arrangement I am able to obtain adequate supply of steam or other fluid to the fabric and cut it off when the bucks close. The movable bucks can be held at any desired temperature by control of the electric heaters and the heat stored in the liquid filled contains 61 is adequate at all times.

The bucks 17 and 18 are moved between open and closed positions by the mechanism shown best in FIGURES 3, 4, 5, 6, 7, 21 and 25. Two brackets 72 and 73 are mounted on the outer face of each buck. They pivot the buck to a lever arm 74 which is in turn supported on posts 75 that extend between upper and lower cross members 76 and 77 of the frame 26. Bearings 78 are provided at both ends of the posts 75 to pivotally support posts on the members 76 and 77. On each lever arm 74 a rock shaft 79 is pivoted. This shaft supports a link 80. The link 80 leads to the end of an arm 82 which is moved forward and back by a jack 83. The link 80 is also pivoted to two bucks 84 which are pivoted on brackets 85 on the wing portions 26a of the frame 26. In operation the jack 83 moves the arms 82 to the right (FIGURE 5) to move the bucks 17 and 18 toward the center buck 16 and when its air connections are reversed it moves the arms to the left. To cushion the return stroke a pair of shock absorbers 86 and 87 engage the arms 82. These arms 82 are pivoted to the piston 88 of the jack 83 by a crosshead 89. The movable bucks are yieldingly held in alignment on the lever arms 74 by two guide rods 91 which are pivoted on the lower cross member 77 and slide through bars 92 pivoted on projections 93 that are formed on the brackets 73. The rods 91 have collars 94 thereon spaced from the bars and springs 95 between the collars 94 and the bar 92 on each projection 93. The springs 95 thus yieldingly oppose misalignment of the bucks 17 and 18.

Figure 16:
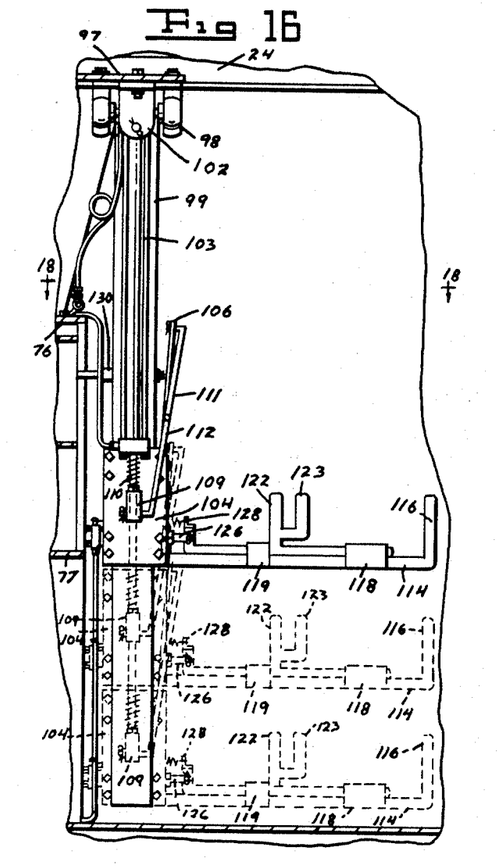
FIGURE 16 is a fragmentary side view on an enlarged scale showing the cuff stretching mechanism.
Figure 17:
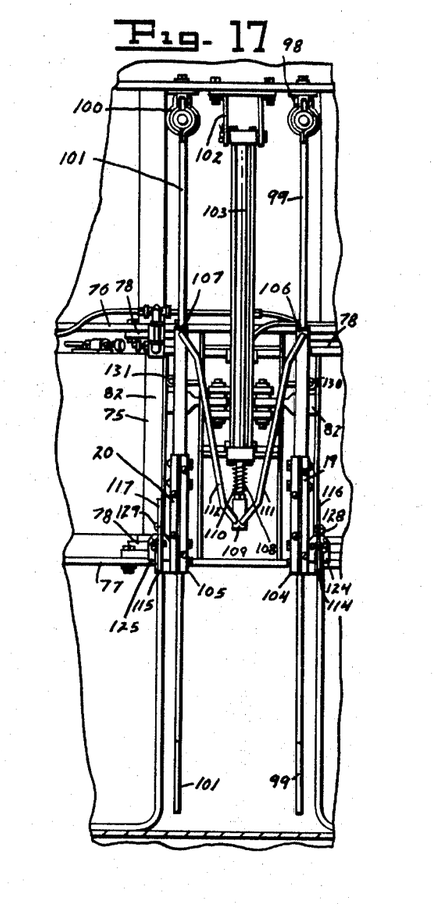
FIGURE 17 is an elevational view looking at FIGURE 16 from the right.
Figure 18:
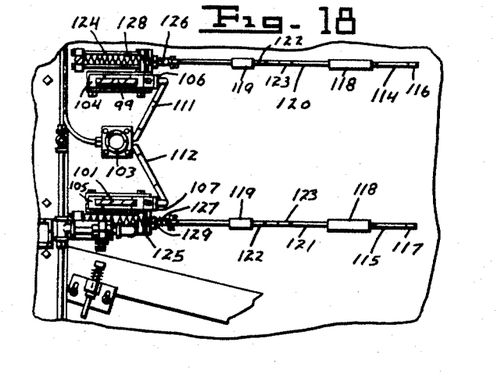
FIGURE 18 is a sectional view on the line 18—18 of FIGURE 16.
Figure 19:
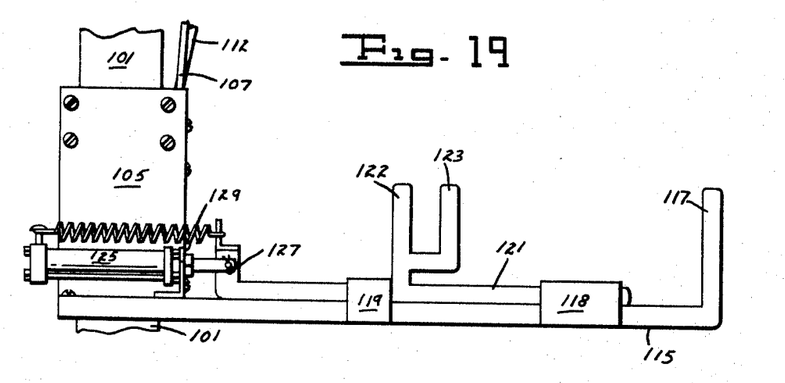
FIGURE 19 is an enlarged view of a cuff stretching member with its actuating cylinder.

The cuff expanders are shown best in FIGURES 14–18 inclusive. A cross frame member 97 extending across the machine between the frame members 24 has two bearings 98 thereon which suspend a bar 99. It has another pair of bearings 100 which suspend a second bar 101. A bracket 102 on the frame member 97 also provides a pivotal suspension for a cylinder 103 so the cylinder swings on an axis at right angles to the axes on which the bars 99 and 101 pivot. The bars 99 and 101 extend almost to the floor of the machine. Cuff expander holding frames 104 and 105 are mounted for vertical sliding movement on the bars 99 and 101 respectively. The frame 104 has a suspension strap 106 extending upwardly from it and the frame 105 has a like strap 107 extending upwardly from it. The cylinder 103 has a piston rod 108 with a head 109 thereon and a cushioning spring 110 is carried on the head. From the head 109 two bent rods 111 and 112 extend upwardly and outwardly to the upper ends of the straps 106 and 107 respectively. Thus the head 109 on the piston rod 108 of the cylinder 103 actually carries the frames 104 and 105 and can move them up and down on the bars 99 and 101 respectively in response to air supply to and withdrawl from the two ends of the cylinder 103. FIGURE 16 shows the frames 104 and 105 in full lines at a raised position and in dotted lines in a lowered position.

Extending forwardly from the frames 104 and 105 at their lower ends are horizontal flat bars 114 and 115 having upstanding cuff receiving portions 116 and 117 at their free ends. The bars 114 and 115 each have guides 118 and 119 thereon for slidably receiving movable cuff expanding bars 120 and 121. Each of the bars 120 and 121 is provided with two upstanding cuff receiving portions 122 and 123.

Means are provided for sliding the bars 120 and 121 endwise through the guides 118 and 119. Air cylinders 124 and 125 are provided on the frames 104 and 105 respectively. These cylinders have their pistons 126 and 127 affixed to the bars 120 and 121 so as to push the bars out. Springs 128 and 129 are connected from the rear of the cylinders to the bars 120 and 121 to retract the bars. The bars 114, 115, 120 and 121 are relatively thin and they extend forward so that the upstanding portions 116, 117, 122 and 123 lie between the movable bucks 17 and 18 and the center buck 16. Thus when the bucks close they press the cuffs and they are not damaged by the presence of the cuff expanders.

The suspension arrangement for the frames 104 and 105 on the swingable cylinder 103 and the upwardly diverging rods 111 and 112 carrying the frames 104 and 105 has been found effective in keeping the legs of the garments in proper position once they are placed on the cuff expanders. This construction tends to spread the bars 99 and 101 when the expander frames are lowered and keeps the cuffs from swinging in against the center buck 16. Bumper bars 130 and 131 on a rear frame portion 132 limit the outward swinging of the bars 99 and 101.

To apply a garment to the device the operator seizes the waist band and opens it up and places the crotch of the garment over the saddle top of the center buck 16. The rear of the waist band is then moved up to engage over the bucks 11a and 11b and the front portion of the waist is brought up around the hip bucks 12 and 13 and between the fly buck 11 and the fly press 14. The air is then supplied to the cylinder 40 to move the bucks 11, 11a and 11b rearwardly and thus expand the bucks against the waist of the garment.

Figure 11:
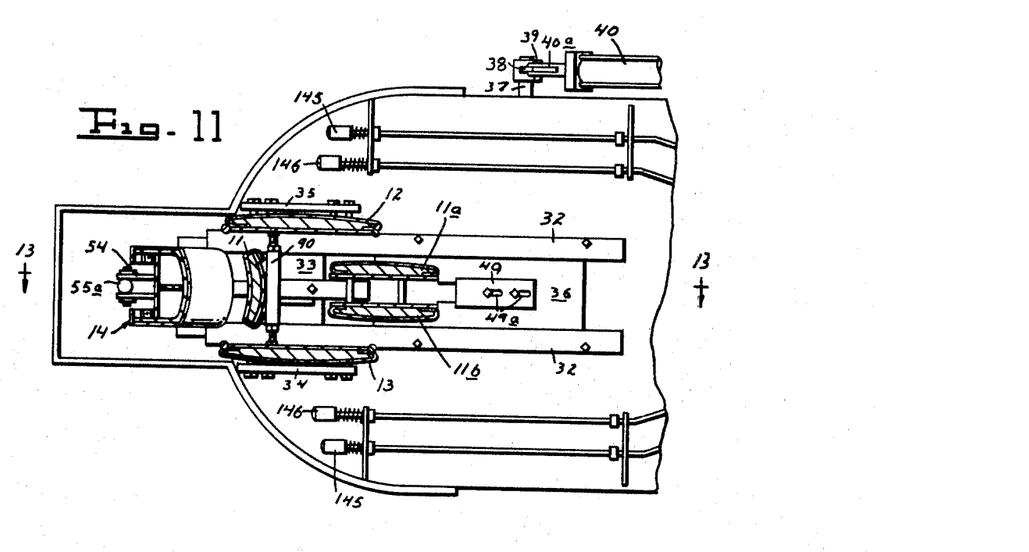
FIGURE 11 is a fragmentary sectional view on an enlarged scale taken on the line 11—11 of FIGURE 8.
Figure 12:
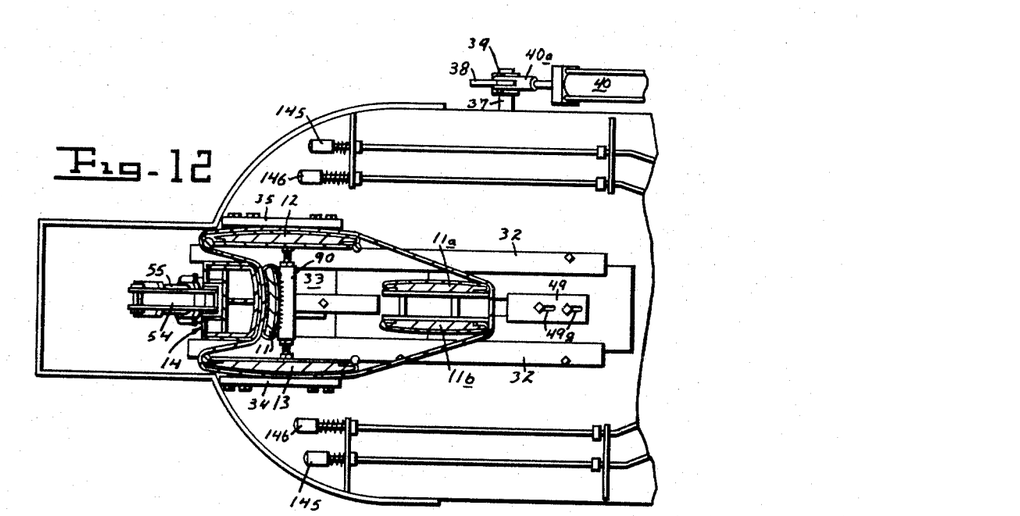
FIGURE 12 is a fragmentary sectional view like FIGURE 11, but showing the parts in pressing position.
Figures 13, 14, 15:
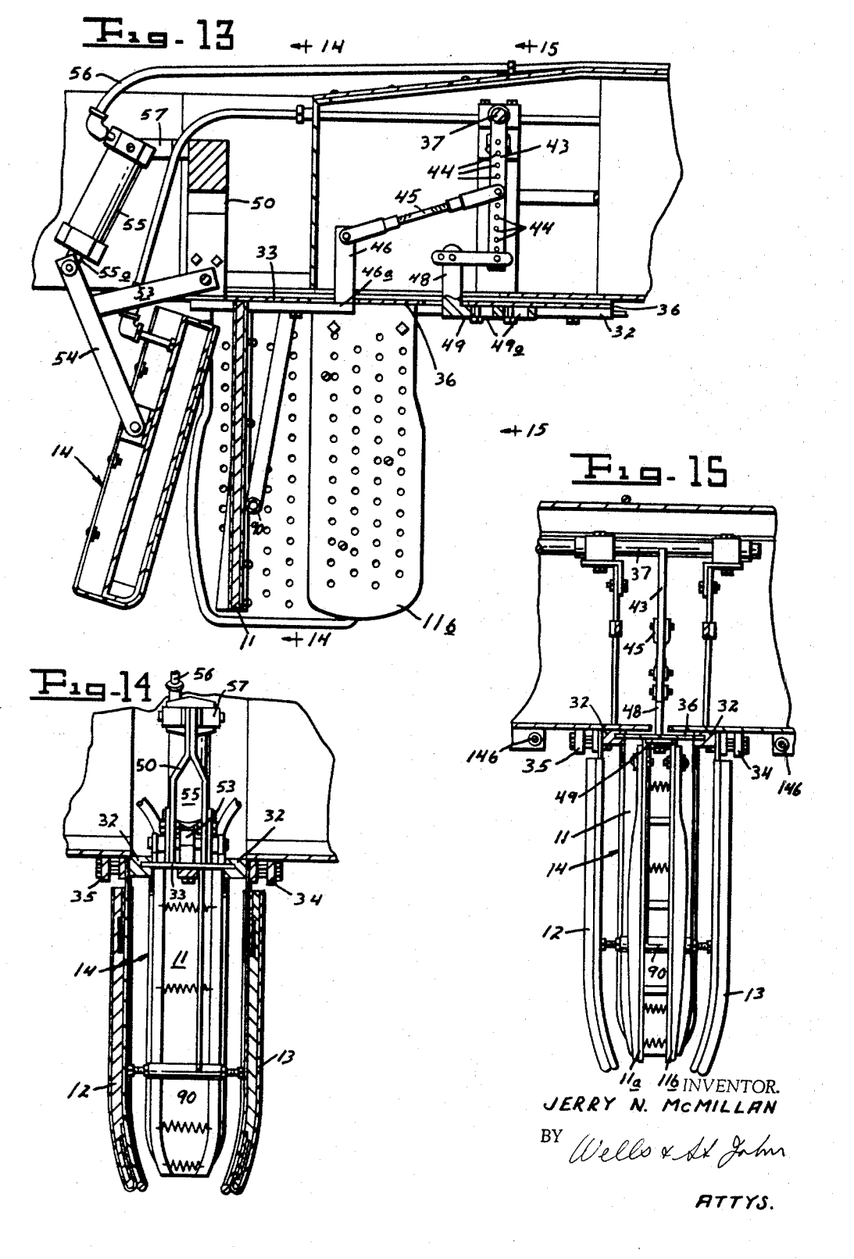
FIGURE 13 is a sectional view taken on the line 13—13 of FIGURE 11.
FIGURE 14 is a sectional view taken on the line 14—14 of FIGURE 13.
FIGURE 15 is a sectional view on the line 15—15 of FIGURE 13.

As shown in FIGURES 11 and 12 the rear bucks 11a and 11b move back. The buck 11 and the press 14 also move back a lesser distance and the waist band is pushed in between the hip bucks 12 and 13 by the press 14. Note that the buck 11 carries a stop member 90 which serves to stop inward movement of the bucks 12 and 13 when pressure is applied by the main bucks 17 and 18. The operator places each cuff of the garment on the proper cuff expander which at this time is in the raised full line position shown in FIGURE 16. The cuff is hooked over one of the members 122 or 123 and pulled forward and hooked over the member 116 or 117. The springs 128 and 129 hold the cuffs expanded. The operator actuates the jack 30 to tilt the expander head 10 forward and down. This moves the bucks 12 and 13 down between the upper offset portitons 17a and 18a of the main bucks. Also the cuff expanders are lowered at the same time.

Figure 1:
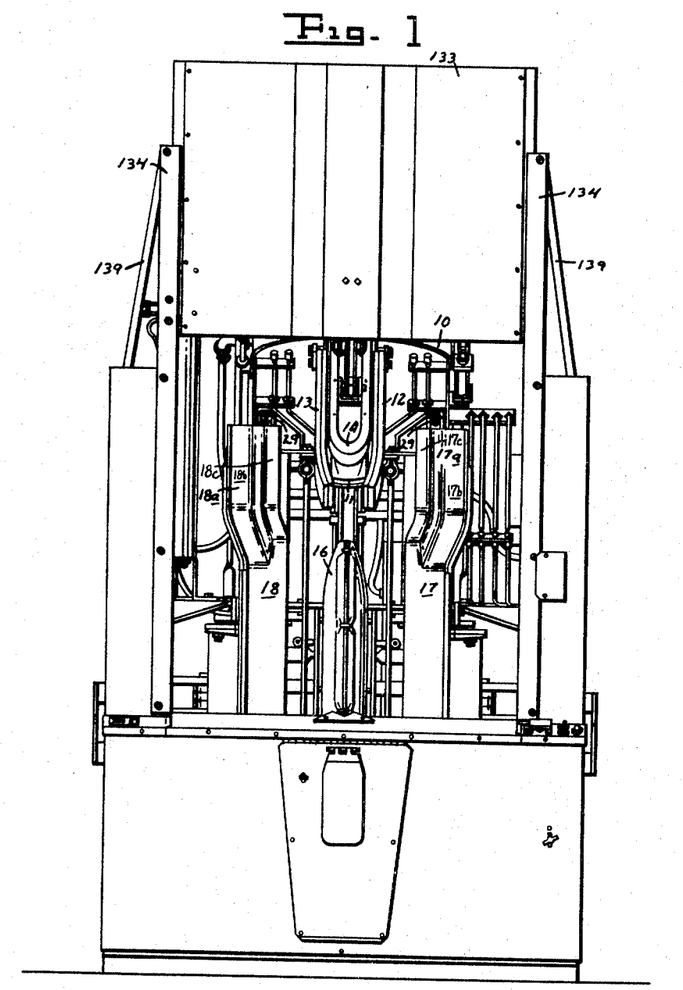
FIGURE 1 is a front view of the machine.
Figure 2:
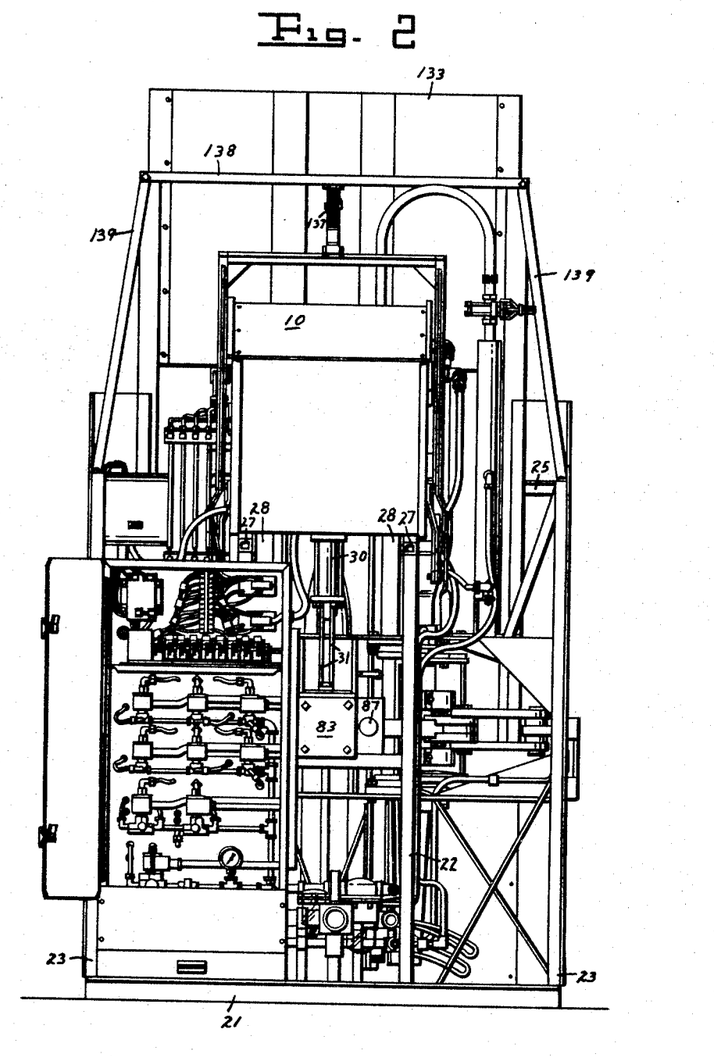
FIGURE 2 is a rear view of the machine.
Figure 3:
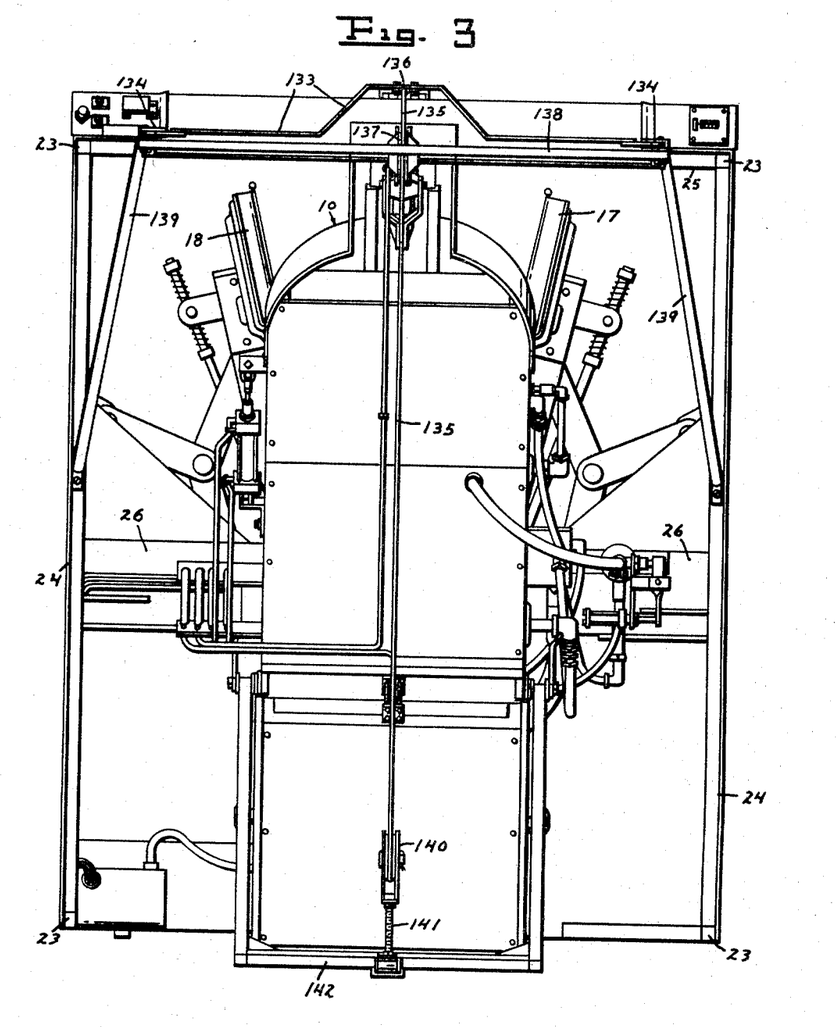
FIGURE 3 is a plan view of the machine.
Figures 4, 25:
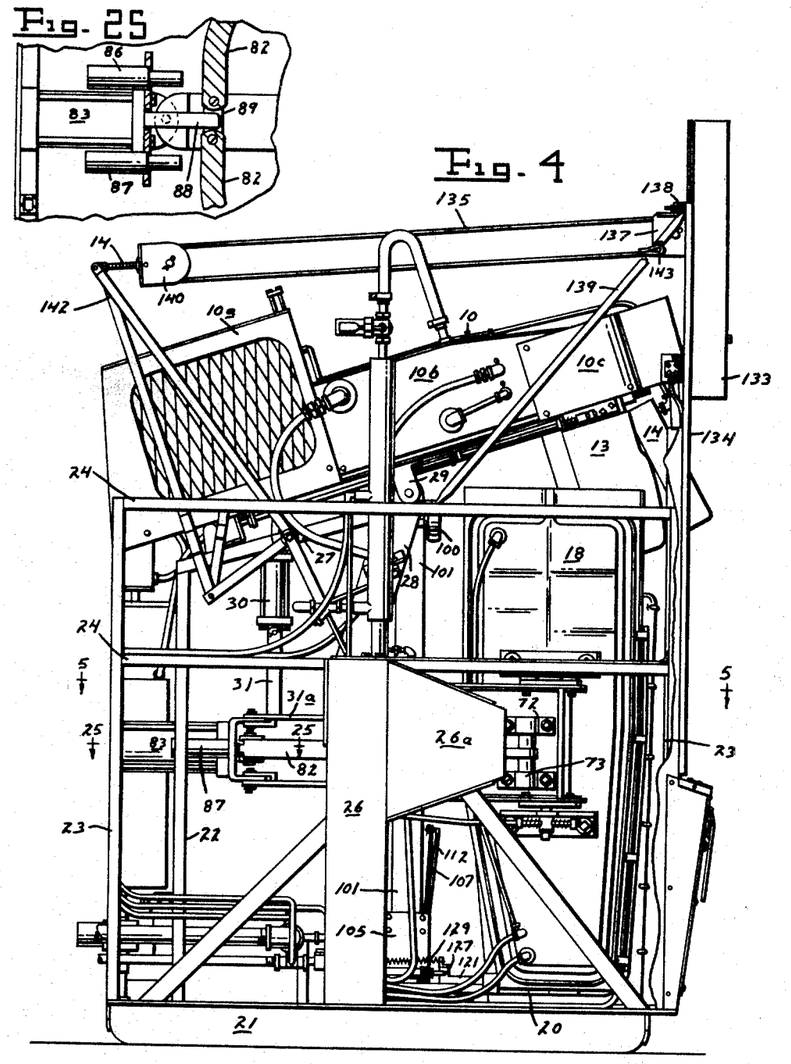
FIGURE 4 is a side view of the machine.
FIGURE 25 is a fragmentary sectional view on the line 25—25 of FIGURE 4.

In order to protect the operator during the pressing operation a front closure 133 is mounted to slide vertically in two guides 134. This closure is suspended on a cable 135 which is secured to the closure 133 at 136 (FIGURE 3). The cable 135 goes up over a pulley 137 which is mounted on a cross bar 138 that connects the upper ends of guides 134. Braces 139 extend down and rearwardly from the ends of the cross bar 138 to the upper side frame members 24. The cable 135 goes rearwardly around a pulley 140 which is adjustably mounted by a threaded member 141 to an upstanding frame 142 that is carried by the expander head 10. The cable 135 after passing around the pulley 140 is returned to the pulley 137 where it is anchored at 143. It is evident that as the expander head is tilted forward it will cause slack in the cable 135 which will allow the closure 133 to slide down in front of the bucks 16, 17 and 18.

The sequence of operation of the machine has been partially set forth herein. However, it will be set forth briefly again at this point. The initial position of the machine is with the expander head 10 raised. The first operation is to place the crotch of the garment on the saddle shaped top of the center buck 16 and to raise the waist band up around the expander bucks 11a, 11b, 12 and 13 with the front thereof between the buck 11 and the press 14. While holding the waist band at the sides the operator then presses outside control buttons 145. This actuates the jacks 40 and 55 to expand the waist band and to close the press 14 against the pants fly. To release the expander either one of the inside control buttons 146 may be pressed. The cuffs are then placed on the cuff expanders. The next step is to actuate the jack 30 to tilt the expander head 10 forward and lower the closure 133. The remainder of the operation is automatic. Air is supplied to the interior of the garment legs from the section 10b of the head 10 down between the bucks 11a, 11b, 12 and 13 to expand the legs. Steam is circulated through the press 14. Air is supplied to the top of the jack 103 to stretch the garment legs. Steam is supplied to the jets 67. The jack 83 is actuated to close the hot bucks 17 and 18 against the legs and the buck 16 and the hip bucks 12 and 13 and the seat bucks 11a and 11b and the air supply from 10b is cut off. This completes the pressing operation. The bucks 17 and 18 are then moved back by reversing the jack 83. Steam is cut off from the press 14 and the jets 67. Then the jack 30 is actuated to raise the expander head 10 and air is supplied to the cylinders 124 and 125 to retract the cuff expanders so the cuffs can slip off of them as the head 10 is raised. The air supply is cut off from the cylinders 40 and 55 to release the waist band. The pressed garment is then free for removal and the device is then ready to receive a new garment.

The control circuits, switch, etc. have not been described in detail. Any suitable control circuits to carry out the desired sequence and timing of the various operations can be used.

Having described my invention, I claim:

1. In an apparatus for finishing fabric trousers having an upright center buck mounted thereon for receiving the crotch and leg portions of the trousers, the improvement comprising:
   (a) a frame;
   (b) a waist expanding head movably mounted on the frame for movement to and from a position immediately above the center buck, said waist expanding head having spaced apart hip bucks mounted thereon for receiving the hip portion of the trousers and movably mounted front and rear members between the hip bucks for stretching the waist portion of the trousers about the spaced hip buck; and
   (c) side bucks movably mounted to the frame on opposite sides of the center buck for movement to the center buck and the hip bucks when the waist expanding head is immediately above the center buck.

2. In the apparatus as defined in claim 1 where the hip bucks straddle the crotch receiving portion of the center buck when the head is immediately above the center buck and wherein further each of the side bucks has a lower section that extends substantially the length of the center buck for pressing the trouser legs and an upper section that extends upwardly from the lower section for pressing the hip portions of the trousers against the corresponding hip bucks.

3. In the apparatus as defined in claim 1 wherein the rear waist member includes seat bucks that are movably mounted for movement away from the hip bucks to stretch the trousers about the hip bucks.

4. In the apparatus as defined in claim 3 wherein the upper sections of the side bucks have protruding surfaces for pressing the seat portions of the trousers against the seat bucks.

5. In the apparatus as defined in claim 1 wherein the front and rear waist members are reciprocally mounted so that the front waist member moves a shorter distance than the rear waist member to stretch the waist portion of the trousers about the spaced hip bucks.

6. The invention as defined in claim 1 further comprising steam tubes mounted on the framework for spraying steam across inner faces of the side pressing bucks.

7. In an apparatus for finishing fabric trousers having a framework, a center pressing buck thereon, two side pressing bucks movable on said framework against the center buck for pressing the trousers, the improvement comprising:
   liquid chambers within said side bucks;
   a liquid filling for said chambers capable of remaining substantially liquid at temperatures above 400 degrees F.;
   means to heat said side bucks; and
   means to supply steam to the spaces between the center buck and side bucks.

8. The device defined in claim 7 wherein the means to supply steam comprises:
   steam tubes extending along the front edges of the movable bucks and having steam outlets directed rearwardly;
   mounting means for each of said tubes yieldably supporting it in a position closer to the center buck than the adjacent edge of the movable buck so that when the movable bucks close against the center buck the tubes are pushed back by the center buck.

9. In an apparatus for finishing fabric trousers having an upright center buck mounted on a frame for receiving the trouser crotch and legs, the improvement comprising:
   (a) a waist expanding head movably mounted on the frame for movement to and from a position immediately above the center buck, said waist expanding head including:
      (1) spaced hip bucks that straddle the crotch receiving portion of the center buck for receiving the hip portions of the trousers; and
      (2) movably mounted seat bucks for receiving the seat portions of the trousers and for moving the hip bucks;
      (3) movably mounted fly buck for receiving the fly portion of the trousers and for moving in relationship to the hip bucks and in coordination with the seat bucks to stretch the waist portion of the trousers about the hip bucks;
   (b) side bucks movably mounted on the frame for movement to and from the center buck and the waist expanding head, said side bucks having lower sections for pressing the trouser legs against the center buck and upper sections for pressing the trouser legs against the center buck and upper sections that are contoured for pressing the hip and seat portions of the trousers against the hip and seat bucks respectively.

10. In an apparatus for finishing fabric trousers having a framework, a center pressing buck thereon, two side pressing bucks movably mounted on opposite sides of the center pressing buck for movement against the center pressing buck, the improvement comprising:
    a waist band expanding head movably mounted on the framework for movement from a mounting position to a pressing position between the movable side pressing bucks and in juxtaposition to the center pressing buck, said waist band expanding head having hip bucks mounted thereon for receiving the hip portions of the trousers and front and rear waist members mounted for stretching the waist portion of the trousers about the hip bucks;
    cuff expanders mounted on said framework for up and down movement between the center buck and said movable side bucks;
    a first power means on said expanding head operable to move the front and rear waist members to stretch the waist portion of the trousers about the hip bucks while the head is in the mounting position and keep the waist portion stretched while the head is moved to and from the pressing position;
    means on the framework connected to the cuff expanders for lowering the cuff expanders to longitudinally stretch the trousers between the cuffs and the waist band; and
    a second power means on the framework operable to close the side pressing bucks against the center pressing buck and hip bucks while the head is in the pressing position to press the trousers.

11. The invention as defined in claim 10 wherein said rear waist member includes seat bucks movably mounted for movement rearward from the hip bucks.

12. The invention as defined in claim 11 wherein the front waist members include a fly buck movably mounted between the hip bucks and a movably mounted fly press and wherein first power means includes a drive means for moving the fly press against the fly buck to secure the fly portion of the trousers therebetween and to further move the fly press to move the fly buck to stretch the trouser waist.

13. The invention as defined in claim 12 wherein the first power means moves the seat bucks a greater distance than the fly bucks to uniformly stretch the waist portion of the trousers about the hip bucks.

14. The invention defined in claim 10 wherein said waist band expanding head comprises a pair of spaced hip bucks fixed to the head;
    a fly buck between said spaced hip bucks mounted on the head for fore and aft sliding movement;
    seat buck means between said spaced side bucks mounted on the head for fore and aft movement;
    a support plate for said fly buck;
    a support plate for said seat bucks;
    means on the head operable to move the plates rearwardly in unison but at different rates;
    a fly press suspended on the fly buck support plate in front of the fly buck to receive the trouser fly therebetween; and
    means for closing the fly press against the fly bucks.

References Cited

UNITED STATES PATENTS 2,658,649  11/1953  Rosenthal __________ 223—73
3,066,430  12/1962  Kannegiesser et al. ______ 38—66

PATRICK D. LAWSON, *Primary Examiner.*

GEORGE V. LARKIN, *Assistant Examiner.*

U.S. Cl. X.R.

38—21